US012791473B2

(12) United States Patent
Takahashi et al.

(10) Patent No.: US 12,791,473 B2
(45) Date of Patent: Nov. 10, 2026

(54) INTERFEROMETRIC MEASUREMENT APPARATUS

(71) Applicant: HAMAMATSU PHOTONICS K.K., Hamamatsu (JP)

(72) Inventors: Hisanari Takahashi, Hamamatsu (JP); Kazuue Fujita, Hamamatsu (JP); Naoya Kawai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 72 days.

(21) Appl. No.: 19/057,053

(22) Filed: Feb. 19, 2025

(65) Prior Publication Data

US 2025/0264407 A1 Aug. 21, 2025

(30) Foreign Application Priority Data

Feb. 21, 2024 (JP) ................................ 2024-024434

(51) Int. Cl.

*G01N 21/00* (2006.01)
*G01N 21/3581* (2014.01)
*G01N 21/35* (2014.01)

(52) U.S. Cl.

CPC . *G01N 21/3581* (2013.01); *G01N 2021/3595* (2013.01)

(58) Field of Classification Search

CPC .... G01J 3/45; G01N 21/3581; G01N 21/3586
See application file for complete search history.

(56) References Cited

U.S. PATENT DOCUMENTS

2012/0153148 A1* 6/2012 Federici ............. G01N 21/3581 250/332
2019/0271642 A1* 9/2019 Horita ..................... G01J 3/433

FOREIGN PATENT DOCUMENTS

JP 6276758 B2 2/2018

OTHER PUBLICATIONS

Neu, Jens et al., "Tutorial: An introduction to terahertz time domain spectroscopy (THz-TDS)," Journal of Applied Physics. 124, 231101 (2018)., Dec. 17, 2018, p. 231101-1-p. 231101-14.

(Continued)

*Primary Examiner* — Dani Fox

(74) *Attorney, Agent, or Firm* — Faegre Drinker Biddle & Reath LLP

(57) ABSTRACT

An interferometric measurement apparatus includes a light source that outputs a terahertz wave and reference light with a wavelength of 3 μm or more, an interferometric optical system that includes: a beam splitter that splits the terahertz wave and the reference light into a first split light and a second split light; a first optical path on which the first split light is reflected by a first mirror and re-enters the beam splitter; and a second optical path on which the second split light is reflected by a rotating mirror and re-enters the beam splitter, an interference intensity measurement unit that measures the intensity of the first interference light based on the electrical signal output from the photomultiplier tube, and an analysis unit that performs Fourier transform based on the intensity of the first interference light and the detection result of the second interference light to analyze an analyze-target object.

9 Claims, 11 Drawing Sheets

(56) References Cited

OTHER PUBLICATIONS

Murate, K. et al., “Perspective: Terahertz wave parametric generator and its applications,” Journal of Applied Physics. 124, 160901 (2018)., Oct. 17, 2018, p. 160901-1-p. 160901-10.
Yamaguchi, Masashi et al., “Terahertz wave generation in nitrogen gas using shaped optical pulses,” J. Opt. Soc. Am. B, vol. 26, No. 9 (2009)., Jul. 8, 2009, p. A90-p. A94.

* cited by examiner

INTERFEROMETRIC MEASUREMENT APPARATUS

TECHNICAL FIELD

The present disclosure relates to an interferometric measurement apparatus.

CROSS-REFERENCE TO RELATED APPLICATIONS

This application claims the benefit of priority from Japanese Patent Application No. 2024-024434 filed on Feb. 21, 2024, the entire contents of which are incorporated herein by reference.

BACKGROUND

Terahertz waves are light in the intermediate region between light waves and radio waves (band around a frequency of 1 THz) and have unique absorption spectra for analytes such as pharmaceuticals that are not seen in other wavelength bands. Therefore, their use in the identification of analytes is expected. Various techniques using terahertz waves for analysis are known.

Terahertz Time Domain Spectroscopy (THz-TDS) measures the time waveform of terahertz waves transmitted, reflected, or totally reflected by an analyte, and analyzes the analyte by Fourier transforming the time waveform of the electric field amplitude of the terahertz waves obtained by this measurement (Non-Patent Document 1: Jens Neu, et al, "Tutorial: An introduction to terahertz time domain spectroscopy (THz-TDS)," J. Appl. Phys. 124, 231101 (2018)). Hereinafter, this will be referred to as "Related Art 1". In Related Art 1, a lock-in amplifier is used when measuring the time waveform of terahertz waves.

By using a terahertz wave source with a variable output wavelength and detecting the terahertz waves transmitted, reflected, or totally reflected by the analyte, the analyte can be analyzed (Non-Patent Document 2: K. Murate, et al, "Perspective: Terahertz wave parametric generator and its applications," J. Appl. Phys. 124, 160901 (2018)). Hereinafter, this will be referred to as "Related Art 2". In Related Art 2, a thermal detector is used for detecting terahertz waves.

Furthermore, Fourier spectroscopy using interferometric measurement with terahertz waves, similar to Fourier Transform Infrared Spectroscopy (FTIR), can also be used to analyze analytes (Non-Patent Document 3: Masashi Yamaguchi, et al, "Terahertz wave generation in nitrogen gas using shaped optical pulses," J. Opt. Soc. Am. B, Vol. 26, No. 9 (2009)). Hereinafter, this will be referred to as "Related Art 3". In Related Art 3, a thermal detector is used for detecting the interference of terahertz waves.

SUMMARY

In Related Art 1, a long integration time using a lock-in amplifier is required when measuring the time waveform of terahertz waves. In Related Arts 2 and 3, thermal detectors with slow response are used, resulting in long measurement times. Conventional analysis techniques using terahertz waves, including Related Arts 1 to 3, require a long time for measurement.

Therefore, one aspect of the present disclosure aims to provide an interferometric measurement apparatus capable of performing interferometric measurement using terahertz waves quickly and suitably.

The present disclosure includes the following interferometric measurement apparatuses [1] to [9].

[1] An interferometric measurement apparatus including:

a light source that outputs a terahertz wave for interferometric measurement and a reference light with a wavelength of 3 μm or more for measuring optical path length difference;

an interferometric optical system that includes: a beam splitter that splits the terahertz wave and the reference light output from the light source and incident coaxially into a first split light and a second split light; a first optical path on which the first split light from the beam splitter is reflected by a first mirror and re-enters the beam splitter; and a second optical path on which the second split light from the beam splitter is reflected by a second mirror and re-enters the beam splitter, and wherein the interferometric optical system is configured to combine the first split light and the second split light re-entered into the beam splitter, wherein the optical path length difference between the first split light and the second split light is variable;

a photomultiplier tube sensitive to the terahertz wave, and configured to output an electrical signal value in accordance with an incident light intensity of a first interference light that is an interference light of the terahertz wave generated by the combination of the first split light and the second split light at the beam splitter;

a detector configured to detect a second interference light that is an interference light of the reference light generated by the combination of the first split light and the second split light at the beam splitter;

an interference intensity measurement unit configured to measure an intensity of the first interference light based on the electrical signal output from the photomultiplier tube; and an analysis unit configured to perform Fourier transform based on the intensity of the first interference light measured by the interference intensity measurement unit and a detection result of the second interference light by the detector, thereby analyzing an analyze-target object disposed on the optical path through which the terahertz wave passes.

Conventionally, when incorporating a mechanism using reference light for measuring optical path length difference into an interferometric measurement apparatus, it is common to use light with a relatively short wavelength as the reference light to measure the optical path length difference as finely as possible. In contrast, in the interferometric measurement apparatus of [1], light with a relatively long wavelength (3 μm or more) is purposely used as the reference light. This allows for suitable resolution and dynamic range in measuring the optical path length difference in Fourier spectroscopy analysis using terahertz waves. Furthermore, a beam splitter for transmitting terahertz waves generally does not transmit visible to near-infrared light, but by using reference light with a wavelength of 3 μm or more (i.e., mid-infrared to far-infrared light), a common beam splitter can be used for both the terahertz wave and the reference light. This allows the optical path for the terahertz wave to generate the first interference light and the optical path for the reference light to generate the second interference light to be set on the same optical path (i.e., the first optical path and the second optical path). As a result, the optical path length difference in the first interference light can be accurately measured based on the second interference light of the reference light generated on the same optical path as the terahertz wave. According to the above configuration, while continuously changing the optical path length difference between the first split light and the second split light, measurement can be performed while appropriately monitoring the change in the optical path length difference in real-time based on the second interference light, enabling fast and suitable interferometric measurement using terahertz waves.

[2] The interferometric measurement apparatus according to [1], wherein the analysis unit is configured to:

convert the intensity of the first interference light measured by the interference intensity measurement unit into an electric field amplitude value based on a relationship between the electric field amplitude value of the light incident on the photomultiplier tube and the electrical signal value output from the photomultiplier tube, thereby calculating the electric field amplitude value of the first interference light for each value of time difference corresponding to the optical path length difference; and perform Fourier transform based on dependency of the calculated electric field amplitude value of the first interference light on the value of the time difference to analyze the analyze-target object.

According to the configuration of [2], by obtaining the electric field amplitude value of the first interference light for each value of time difference corresponding to the optical path length difference through conversion based on the relationship between the electric field amplitude value and the electrical signal value, Fourier spectroscopy using interferometric measurement with terahertz waves can be performed quickly and accurately.

[3] The interferometric measurement apparatus according to [1] or [2], wherein the interferometric optical system is configured to be capable of changing an optical path length of the first optical path by driving the first mirror and capable of changing an optical path length of the second optical path by driving the second mirror.

According to the configuration of [3], one mirror (e.g., the first mirror) can be used as an initial setting mirror for adjusting the optical path length difference to be near zero in the initial state, and the other mirror (e.g., the second mirror) can be used as a mirror for changing the optical path length difference during interferometric measurement, enabling a suitable configuration for interferometric measurement.

[4] The interferometric measurement apparatus according to any one of [1] to [3], wherein the interferometric optical system further includes a third mirror, wherein the second mirror is configured to be rotationally driven so that an optical path length of the second optical path changes, and wherein the second optical path is configured by an optical path from the beam splitter to the third mirror via the second mirror and an optical path returning to the beam splitter via the second mirror after being reflected by the third mirror.

According to the configuration of [4], by rotationally driving the second mirror configured as a rotating mirror, measurement can be performed while changing the optical path length difference quickly compared to using a mirror that can be moved parallel to the direction perpendicular to the reflecting surface. As a result, the analysis by the interferometric measurement apparatus can be sped up.

[5] The interferometric measurement apparatus according to any one of [1] to [4], wherein the detector is any one of a quantum cascade detector, an MCT detector, a superlattice infrared detector element, an InSb detector element, an InAs detector element, and an InAsSb detector element.

According to the configuration of [5], by using a detector that operates with high sensitivity and high speed as a light detector in the mid-infrared region, the second interference light (interference light of the reference light) can be efficiently detected.

[6] The interferometric measurement apparatus according to any one of [1] to [5], wherein the light source includes a first light source that outputs the terahertz wave and a second light source that outputs the reference light, and the second light source is constituted by a quantum cascade laser element.

To detect the second interference light with high precision in the detector, it is preferable to use light with as narrow a spectral linewidth (wavelength linewidth) as possible as the reference light. According to the configuration of [6], by using a quantum cascade laser element with the property of outputting light with a relatively narrow spectral linewidth as the second light source, the detection precision of the second interference light in the detector can be enhanced.

[7] The interferometric measurement apparatus according to any one of [1] to [5], wherein the light source is constituted by a single quantum cascade laser element having a dual upper subband level structure and capable of generating both the terahertz wave and the reference light by multiple intersubband transitions.

According to the configuration of [7], it is possible to output both the terahertz wave for interferometric measurement and the reference light for measuring optical path length difference with a single light source (quantum cascade laser element). As a result, compared to the case where the light source is constituted by two light sources (i.e., a first light source that outputs the terahertz wave and a second light source that outputs the reference light), the number of light sources can be reduced. Furthermore, it is unnecessary to use a member for adjusting the terahertz wave output from the first light source and the reference light output from the second light source to be incident coaxially on the beam splitter (e.g., a second beam splitter different from the above beam splitter). Therefore, according to the configuration of [7], the configuration of the light source and the interferometric optical system can be simplified.

[8] The interferometric measurement apparatus according to any one of [1] to [6], further including a light source control unit configured to control a driving of the light source, wherein the light source includes a first light source that outputs the terahertz wave and a second light source that outputs the reference light, and the light source control unit synchronizes the first light source and the second light source in pulse mode.

According to the configuration of [8], by synchronizing and pulse-driving the first light source and the second light source, cooling of the first light source and the second light source can be made unnecessary. Furthermore, compared to the case where the first light source and the second light source are continuously driven, the device life of the first light source and the second light source can be extended.

[9] The interferometric measurement apparatus according to any one of [1] to [8], wherein the interferometric optical system is configured to be capable of changing an optical path length of the second optical path by driving the second mirror, and a range of periodic change in the optical path length difference between the first split light and the second split light by the driving of the second mirror is 3 mm or more.

According to the configuration of [9], appropriate resolution and measurement dynamic range can be obtained for the optical path change of the terahertz wave.

According to one aspect of the present disclosure, it is possible to provide an interferometric measurement apparatus capable of performing interferometric measurement using terahertz waves quickly and suitably.

DETAILED DESCRIPTION

Figure 1:
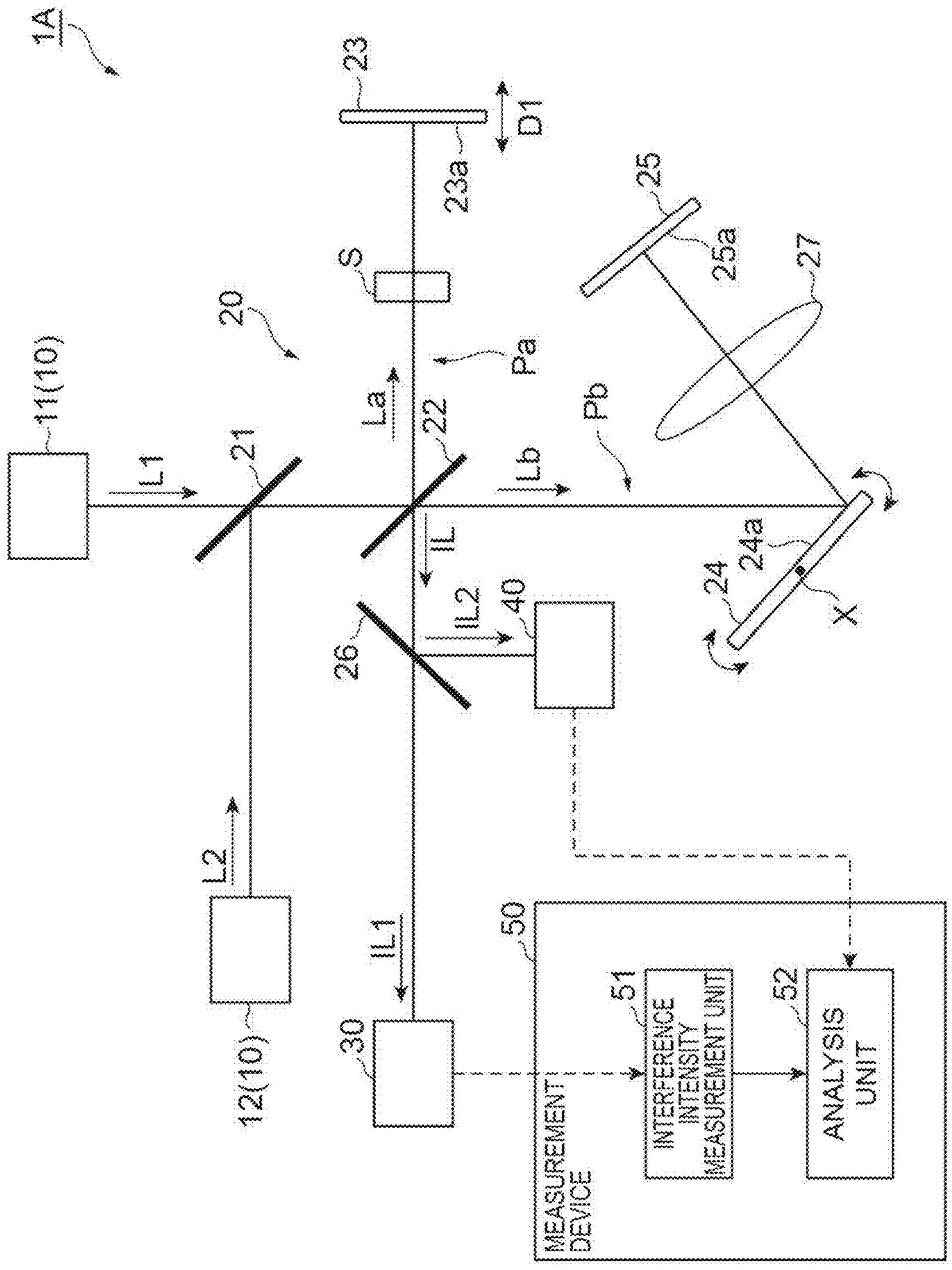
FIG. 1 is a diagram showing a configuration example of an interferometric measurement apparatus according to the first embodiment.

Hereinafter, an embodiment of the present disclosure will be described in detail with reference to the drawings. In the following description, the same or corresponding elements are denoted by the same reference numerals, and redundant descriptions are omitted.

First Embodiment

The interferometric measurement apparatus 1A of the first embodiment will be described with reference to FIGS. 1 to 8C. As shown in FIG. 1, the interferometric measurement apparatus 1A includes a light source 10, an interferometric optical system 20, a photomultiplier tube 30, a detector 40, and a measurement device 50.

The light source 10 outputs a terahertz wave L1 for interferometric measurement and a reference light L2 for measuring optical path length difference. In this embodiment, the light source 10 includes a light source 11 (first light source) that outputs the terahertz wave L1 and a light source 12 (second light source) that outputs the reference light L2.

The terahertz wave L1 output from the light source 11 may be a pulsed light or a continuous light. Examples of light sources capable of outputting pulsed terahertz waves include a configuration combining a femtosecond laser light source (e.g., Ti:sapphire laser light source) and a nonlinear optical crystal (e.g., ZnTe), and an injection-seeded terahertz parametric generator (is-TPG). Examples of light sources capable of outputting continuous terahertz waves include a resonant tunneling diode (RTD), an IMPATT diode (Impact Avalanche and Transit Time Diode), a quantum cascade laser light source, and a THz gas laser light source.

The reference light L2 output from the light source 12 is light with a wavelength of 3 μm or more. The reference light L2 is, for example, mid-infrared to far-infrared light with a wavelength of 3 μm to 100 μm. A quantum cascade laser element is cited as a light source that suitably outputs such reference light L2. In this embodiment, the light source 12 is constituted by a quantum cascade laser element that outputs mid-infrared light with a wavelength of 10 μm. The reference light L2 may be pulsed light or continuous light, but when both the terahertz wave L1 and the reference light L2 are pulsed light, it is necessary to control the synchronization of the output of the terahertz wave L1 and the reference light L2. In this embodiment, the case where the terahertz wave L1 is pulsed light and the reference light L2 is continuous light will be described, and the case where both the terahertz wave L1 and the reference light L2 are pulsed light will be described in the second embodiment.

The interferometric optical system 20 includes a beam splitter 21, a beam splitter 22, a mirror 23 (first mirror), a rotating mirror 24 (second mirror), a mirror 25 (third mirror), a beam splitter 26, and a lens 27. The beam splitters 21, 22, and 26 are all made of silicon. By using beam splitters made of silicon, both the terahertz wave L1 and the reference light L2 can be suitably split into components reflected by the beam splitter and components transmitted through the beam splitter.

The beam splitter 21 is disposed between the light source 10 (light sources 11 and 12) and the beam splitter 22. The beam splitter 21 is a member for combining the terahertz wave L1 output from the light source 11 and the reference light L2 output from the light source 12 and making the terahertz wave L1 and the reference light L2 incident coaxially on the beam splitter 22. The beam splitter 21 is arranged such that the terahertz wave L1 is incident on the opposite side of the reference light L2 incident surface of the beam splitter 21. In the example shown in FIG. 1, the terahertz wave L1 component transmitted through the beam splitter 21 and the reference light L2 component reflected by the beam splitter 21 are combined and incident on the beam splitter 22.

The beam splitter 22 splits the terahertz wave L1 and the reference light L2, which are output from the light source 10 (light sources 11 and 12) and incident coaxially, into a split light La (first split light) and a split light Lb (second split light). This forms an optical path Pa (first optical path) through which the split light La passes and an optical path Pb (second optical path) through which the split light Lb passes in the interferometric optical system 20.

For example, the split light La is light that includes the components of the terahertz wave L1 and the reference light L2, each reflected by the beam splitter 22. The optical path Pa of the split light La is an optical path in which the split light La from the beam splitter 22 is reflected by the mirror 23 and re-enters the beam splitter 22 (the exit surface of the split light La in the beam splitter 22). In this embodiment, the optical path Pa is constituted by an optical path from the beam splitter 22 to the mirror 23 (outward path) and an optical path from the mirror 23 to the beam splitter 22 (return path).

For example, the split light Lb is light that includes the components of the terahertz wave L1 and the reference light L2, each transmitted through the beam splitter 22. The optical path Pb of the split light Lb is an optical path in which the split light Lb from the beam splitter 22 is reflected by the rotating mirror 24 and re-enters the beam splitter 22 (the exit surface of the split light Lb in the beam splitter 22). In this embodiment, the optical path Pb is constituted by an optical path from the beam splitter 22 to the mirror 25 via the rotating mirror 24 and the lens 27 (outward path) and an optical path returning to the beam splitter 22 via the lens 27 and the rotating mirror 24 after being reflected by the mirror 25 (return path). The lens 27 is an optical member disposed between the rotating mirror 24 and the mirror 25 to ensure that the split light Lb reflected by the rotating mirror 24 reaches the mirror 25 and that the split light Lb reflected by the mirror 25 reaches the rotating mirror 24 again, even when the rotation angle of the rotating mirror 24 becomes large. The lens 27 converts both the terahertz wave L1 and the reference light L2 into convergent or parallel light. The lens 27 may be formed of plastic materials such as Tsurupica (registered trademark) or ZEONEX (registered trademark), or silicon. Alternatively, an optical member such as a reflective convex mirror or an off-axis parabolic mirror that does not depend on the wavelength of the incident light may be used instead of the lens 27.

The mirror 23 is disposed downstream of the beam splitter 22 in the optical path Pa. In this embodiment, the mirror 23 is configured to be movable in the direction DI along the optical path Pa (the direction perpendicular to the reflecting surface of the mirror 23). The position of the mirror 23 in the direction DI is set such that the optical path length difference Δd between the split light La (optical path Pa) and the split light Lb (optical path Pb) is near zero in the initial state. The split light La incident on the reflecting surface 23*a* of the mirror 23 is reflected by the reflecting surface 23*a* and returned to the beam splitter 22. In this embodiment, the analyte S is disposed between the beam splitter 22 and the mirror 23 in the optical path Pa. The analyte S may be, for example, lactose, sucrose, or other sugars.

The analyte S may be disposed on the optical path through which the terahertz wave L1 passes. For example, the analyte S may be disposed on the optical path Pb (e.g., between the beam splitter 22 and the rotating mirror 24). However, in this embodiment, since the optical path Pb changes during measurement due to the driving of the rotating mirror 24, the conditions (e.g., the position through which the terahertz wave L1 passes and the amplitude of the terahertz wave L1 at the passing position) of the terahertz wave L1 passing through the analyte S (the component of the terahertz wave L1 included in the split light Lb) are not constant. This may cause unexpected measurement errors. From this perspective, it is preferable to dispose the analyte S on the optical path Pa, which does not change during measurement. Alternatively, the analyte S may be disposed on the optical path through which the terahertz wave L1 passes outside the optical paths Pa and Pb (e.g., between the light source 11 and the beam splitter 21, between the beam splitters 21 and 22, between the beam splitters 22 and 26, or between the beam splitter 26 and the photomultiplier tube 30). Disposing the analyte S outside the optical paths Pa and Pb can suppress the reduction of the interference signal (interference light IL) due to the influence of the wavefront distortion of the analyte S. On the other hand, when the analyte S is disposed outside the optical paths Pa and Pb, information on the absorption spectrum of the analyte S can be obtained, but information on the refractive index of the analyte S cannot be obtained. In other words, by disposing the analyte S on the optical path Pa or the optical path Pb, information on both the absorption spectrum and the refractive index of the analyte S can be obtained.

The rotating mirror 24 is disposed downstream of the beam splitter 22 in the optical path Pb. The rotating mirror 24 is configured to be rotatable (oscillatable) within a predetermined angle range around an axis X extending in a direction perpendicular to the optical path Pb (in the example of FIG. 1, a direction perpendicular to the paper surface). The axis X of the rotating mirror 24 is located at a position offset from the optical path Pb. The rotating mirror 24 is configured to be rotatable around the axis X at high speed so as to change the distance between the beam splitter 22 and the reflecting surface 24*a* of the rotating mirror 24 in the optical path Pb. For example, the rotating mirror 24 is configured to rotate within a predetermined angle θmax in the direction in which the optical path length of the optical path Pb increases (i.e., the direction in which the distance from the beam splitter 22 to the reflecting surface 24*a* in the optical path Pb increases (clockwise direction in FIG. 1)) when the angle at which the optical path length difference Δd between the optical path Pa and the optical path Pb becomes zero (i.e., when the angle of the rotating mirror 24 is θr). In other words, the rotating mirror 24 is configured to be rotatable at a predetermined frequency such that the angle of the rotating mirror 24 periodically changes between the angle θr when the optical path length difference Δd is zero and the angle θr+θmax when the optical path length difference Δd ("the optical path length of the optical path Pb—the optical path length of the optical path Pa" in this embodiment) is maximum dmax.

The width of the periodic change in the optical path length difference Δd due to the rotational driving of the rotating mirror 24 (dmax in this embodiment) is set to 3 mm or more, for example. For example, the position of the rotating mirror 24 (i.e., the position of the axis X) is adjusted such that the optical path length difference Δd changes by about 1 μm when the angle of the rotating mirror 24 changes by 0.0025°. In this case, by rotating the rotating mirror 24 with θmax=25°, the optical path length difference Δd can be periodically changed between the state where the optical path length difference Δd is zero (i.e., when the angle of the rotating mirror 24 is θr) and the state where the optical path length difference Δd is dmax (10 μm) (i.e., when the angle of the rotating mirror 24 is θr+θmax).

The mirror 25 is disposed downstream of the rotating mirror 24 in the optical path Pb. The position of the mirror 25 is fixed. The split light Lb incident on the reflecting surface 24*a* of the rotating mirror 24 is reflected by the reflecting surface 24*a* and directed to the reflecting surface 25*a* of the mirror 25 via the lens 27. Subsequently, the split light Lb is reflected by the reflecting surface 25*a* of the mirror 25 and returned to the reflecting surface 24*a* of the rotating mirror 24 via the lens 27 again, and is reflected by the reflecting surface 24*a* again to re-enter the beam splitter 22 (the exit surface of the split light Lb in the beam splitter 22).

In the interferometric optical system 20, as described above, the optical path length difference Δd is variable by rotationally driving the rotating mirror 24. The beam splitter 22 combines the split light La re-entering the beam splitter 22 via the optical path Pa and the split light Lb re-entering the beam splitter 22 via the optical path Pb. In this embodiment, the interference light IL generated by combining the component of the split light La re-entering the beam splitter 22 and transmitted through the beam splitter 22 and the component of the split light Lb re-entering the beam splitter 22 and reflected by the beam splitter 22 is emitted from the beam splitter 22 toward the beam splitter 26.

The interference light IL includes the interference light IL1 (first interference light) of the terahertz wave L1 generated by combining the split light La and the split light Lb and the interference light IL2 (second interference light) of the reference light L2 generated by combining the split light La and the split light Lb. The interference light IL1 is light formed by the interference of the terahertz wave L1 included in the split light La and the terahertz wave L1 included in the split light Lb. The interference light IL2 is light formed by the interference of the reference light L2 included in the split light La and the reference light L2 included in the split light Lb.

The beam splitter 26 splits the interference light IL emitted from the beam splitter 22 into light reflected by the beam splitter 26 and light transmitted through the beam splitter 26.

The photomultiplier tube 30 is disposed downstream of the beam splitter 26 at a position where the light transmitted through the beam splitter 26 is directed. The photomultiplier tube 30 is sensitive to the terahertz wave (i.e., the wavelength range of the terahertz wave L1) and outputs an electrical signal value corresponding to the incident light intensity of the interference light IL1. In this embodiment, the photomultiplier tube 30 outputs an electrical signal value corresponding to the incident light intensity of the interference light IL1 included in the component of the interference light IL transmitted through the beam splitter 26.

Figure 2:
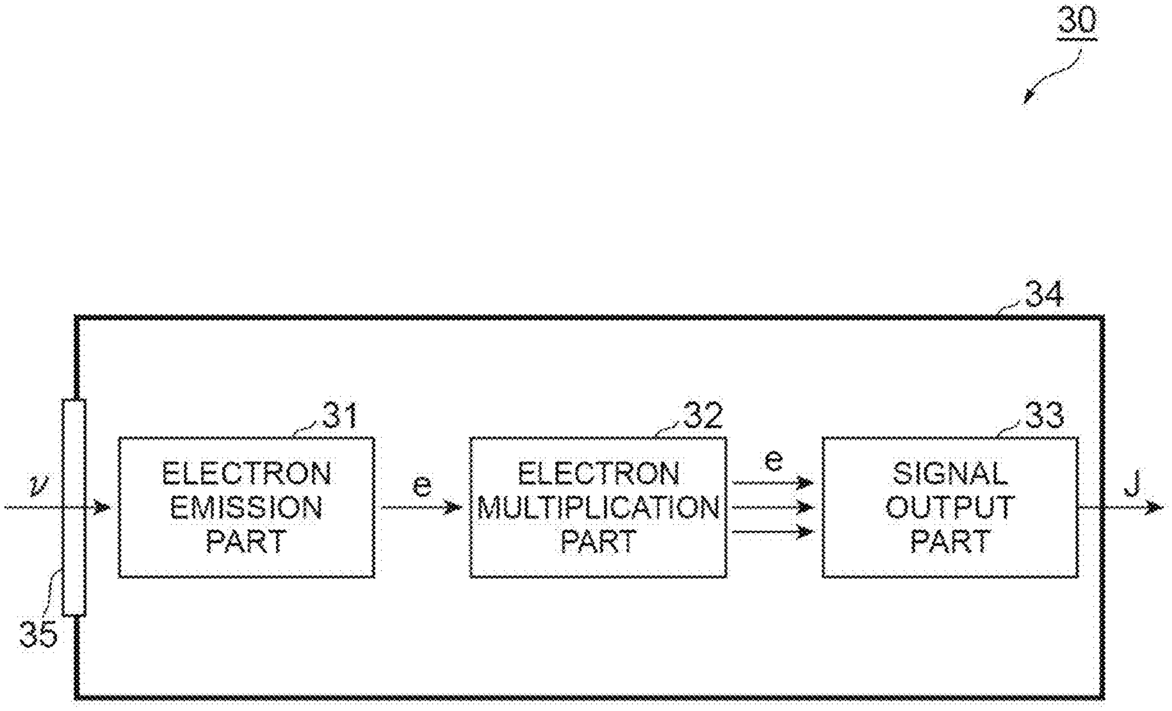
FIG. 2 is a diagram showing a configuration example of a photomultiplier tube 30.

FIG. 2 is a block diagram showing the configuration of the photomultiplier tube 30. The photomultiplier tube 30 includes an electron emission part 31, an electron multiplication part 32, and a signal output part 33, all of which are disposed inside a housing 34 maintained in a vacuum. The housing 34 is provided with a window part 35.

The electron emission part 31 emits electrons e when light v transmitted through the window part 35 is incident. The electron emission part 31 is a photoelectric conversion part designed to be sensitive to the light band including the terahertz wave L1 to be detected. The electron emission part 31 has a configuration in which a metamaterial structure (metasurface) is formed on the main surface of a substrate, and electrons e can be emitted by the incidence of light on the metasurface.

The electron multiplication part 32 multiplies the electrons e emitted from the electron emission part 31. The electron multiplication part 32 includes multiple stages of dynodes or a microchannel plate. The electron multiplication factor in the electron multiplication part 32 depends on the voltage applied to the multiple stages of dynodes or the microchannel plate. The signal output part 33 collects the electrons e multiplied by the electron multiplication part 32 and outputs them as a current signal J. The interference intensity measurement unit 51, described later, may input the current signal J output from the signal output part 33 or the voltage signal after the current signal J is converted by an IV conversion circuit. In this embodiment, the voltage signal is input to the interference intensity measurement unit 51 as the electrical signal value output by the photomultiplier tube 30.

Figure 3A:
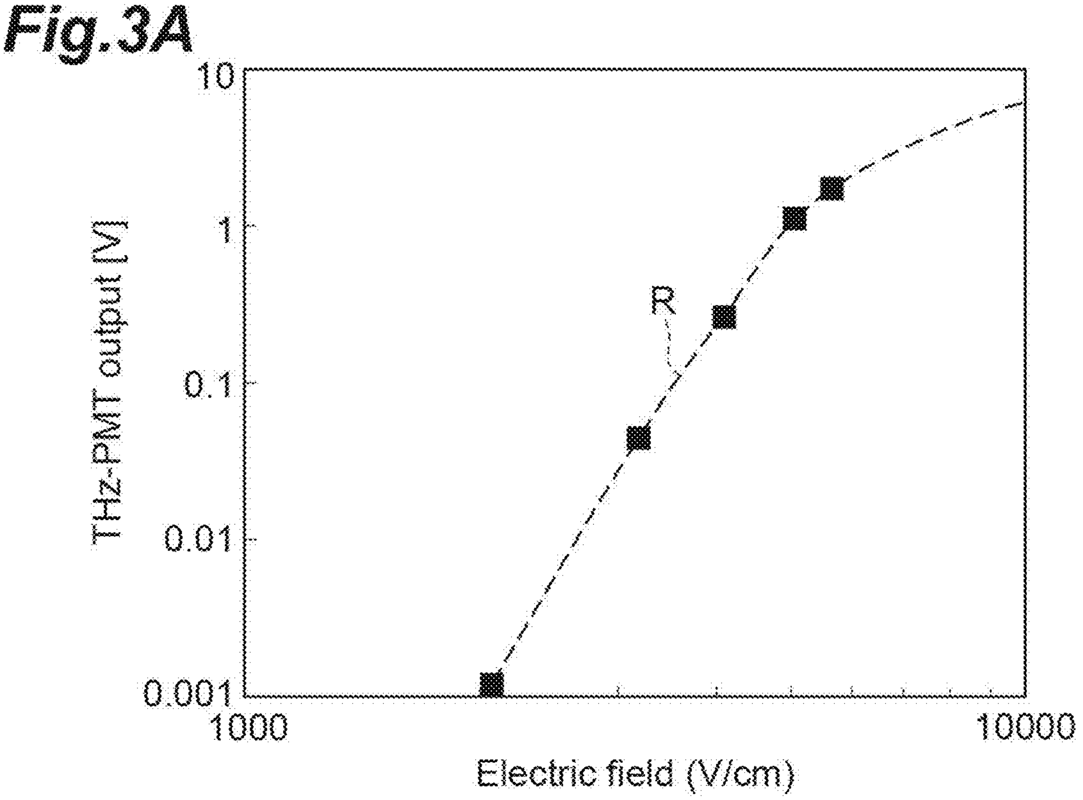
FIG. 3A is a graph showing the input-output characteristics of the photomultiplier tube 30.

FIG. 3A is a diagram showing an example of the input-output characteristics of the photomultiplier tube 30. The horizontal axis represents the electric field amplitude value E of the light (interference light IL1) incident on the photomultiplier tube 30. The vertical axis represents the electrical signal (voltage signal V) output by the photomultiplier tube 30. As shown in this figure, the input-output characteristics of the photomultiplier tube 30 are not linear. These input-output characteristics of the photomultiplier tube 30 are obtained in advance. For example, by performing fitting processing using multiple (five in this example) measurement values shown in FIG. 3A, a fitting function R representing the relationship between the electric field amplitude value E and the voltage signal V can be obtained. Such a fitting function R is stored in the measurement device 50 in advance, for example.

Figure 3B:
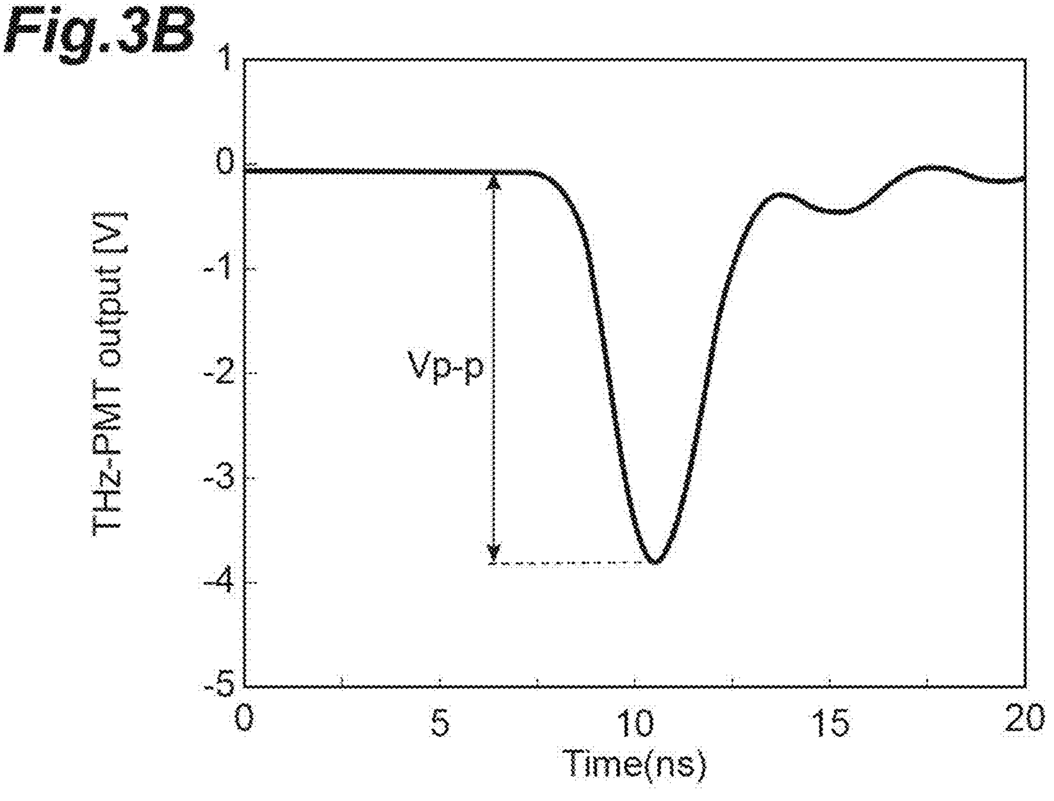
FIG. 3B is a graph showing the time dependence of the voltage signal V output from the photomultiplier tube 30.

FIG. 3B is a graph showing the time dependence of the voltage signal V output by the photomultiplier tube 30. Such a voltage signal V corresponds to the optical path length difference Δd between the split light La (optical path Pa) and the split light Lb (optical path Pb). In other words, the amplitude of the voltage signal V output by the photomultiplier tube 30 (Vp−p) corresponds to the optical path length difference Δd. The analysis unit 52, described later, can read Vp−p from the output result of the photomultiplier tube 30 as shown in FIG. 3B.

The detector 40 is disposed downstream of the beam splitter 26 at a position where the light reflected by the beam splitter 26 is directed. The detector 40 is sensitive to the wavelength range of the reference light L2 and detects the interference light IL2. In this embodiment, the detector 40 outputs an electrical signal value corresponding to the incident light intensity of the interference light IL2 included in the component of the interference light IL reflected by the beam splitter 26. The detector 40 may be constituted by any one of a quantum cascade detector, an MCT detector, a superlattice infrared detector element, an InSb detector element, an InAs detector element, and an InAsSb detector element. According to the above configuration, by using the detector 40 that operates with high sensitivity and high speed as a light detector in the mid-infrared region, the interference light IL2 of the reference light L2 can be efficiently detected.

Figure 4:
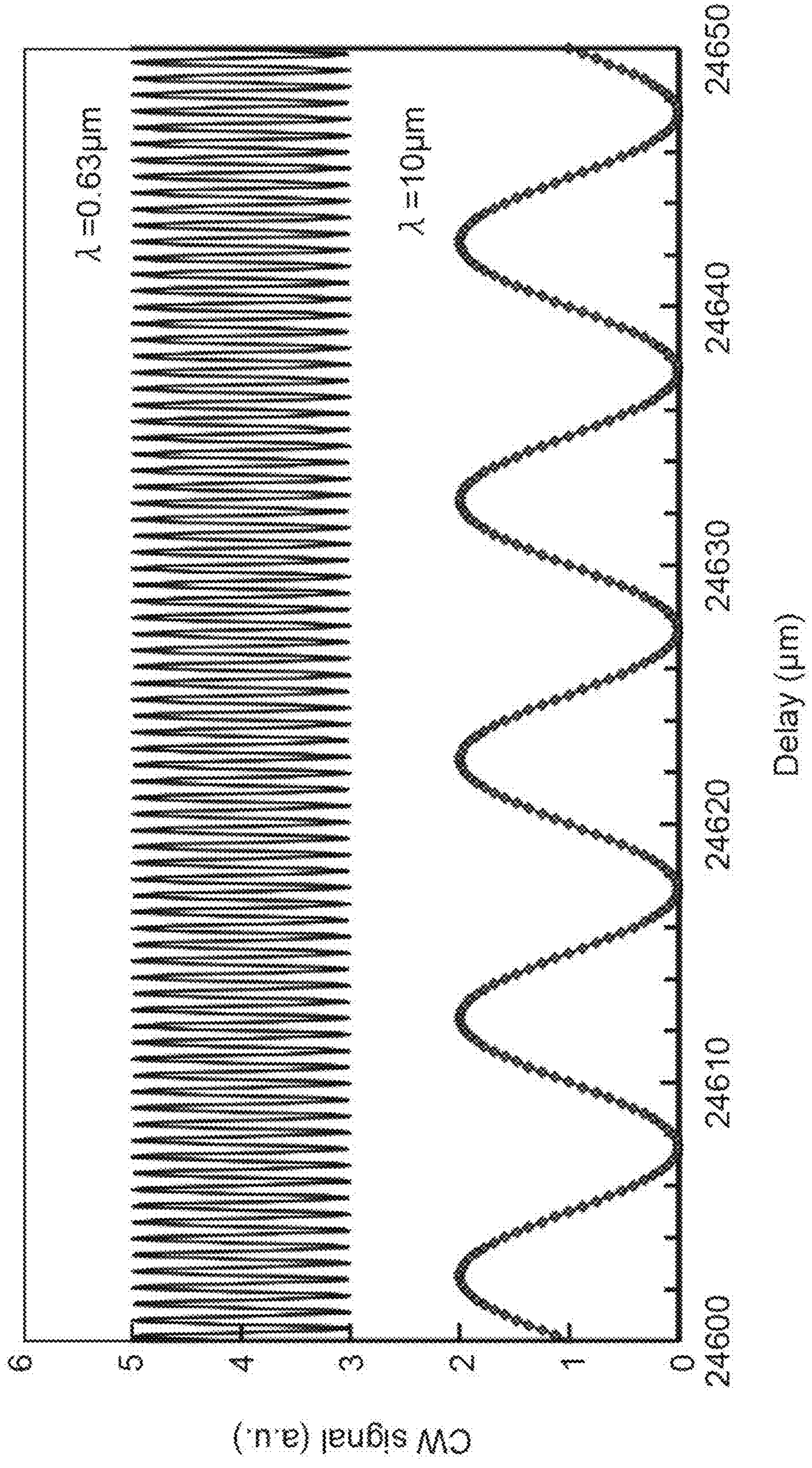
FIG. 4 is a diagram showing an example of the intensity of the interference light IL2 detected by the detector 40 according to the optical path length difference.

FIG. 4 is a diagram showing an example of the intensity of the interference light IL2 detected by the detector 40 in accordance with the optical path length difference Δd. The horizontal axis of the graph shown in FIG. 4 represents the optical path length difference Δd (in this embodiment, the delay amount of the split light Lb relative to the split light La), and the vertical axis represents the intensity of the detected interference light IL2. When the optical path length difference Δd is an integer multiple of the wavelength of the reference light L2 (including the case where the optical path length difference Δd is zero), the reference light L2 included in the split light La and the reference light L2 included in the split light Lb overlap, and the intensity of the interference light IL2 is the largest. In contrast, when the optical path length difference Δd is an odd multiple of half the wavelength of the reference light L2, the reference light L2 included in the split light La and the reference light L2 included in the split light Lb cancel each other out, and the intensity of the interference light IL2 is the smallest. Therefore, when the optical path length difference Δd is continuously changed at a constant frequency by the rotational driving of the rotating mirror 24 as described above, a signal value showing the upper waveform in FIG. 4 is obtained when the wavelength λ of the reference light L2 is set to 0.63 μm, and a signal value showing the lower waveform in FIG. 4 is obtained when the wavelength A is set to 10 μm. In other words, when the angle of the rotating mirror 24 is set to an angle corresponding to a certain optical path length difference, a signal value with an intensity corresponding to that optical path length difference can be obtained. Therefore, based on the intensity of the interference light IL2 detected by the detector 40, the optical path length difference Δd at the time the interference light IL2 is detected can be accurately estimated.

The measurement device 50 performs Fourier spectroscopy analysis using terahertz waves L1 based on the output values of the photomultiplier tube 30 and the detector 40. The measurement device 50 includes an interference intensity measurement unit 51 and an analysis unit 52. The measurement device 50 may be constituted by a computer system including a processor, memory, storage, communication devices, etc. Each function provided by the measurement device 50 (interference intensity measurement unit 51 and analysis unit 52) is executed by these hardware elements operating according to a predetermined program.

The interference intensity measurement unit 51 measures the intensity of the interference light IL1 based on the electrical signal (voltage signal V in this embodiment) output by the photomultiplier tube 30. In this embodiment, the interference intensity measurement unit 51 acquires the amplitude of the voltage signal V (Vp−p) as shown in FIG. 3B at each measurement point (e.g., at each pulse of the pulsed terahertz wave L1) as a value indicating the intensity of the interference light IL1.

The analysis unit 52 performs Fourier transform based on the intensity of the interference light IL1 measured by the interference intensity measurement unit 51 and the detection result of the interference light IL2 by the detector 40, thereby analyzing the analyze-target object S disposed on the optical path Pa or Pb. In this embodiment, as an example, the analysis unit 52 executes the following first and second processes.

(First Process)

The analysis unit 52, as the first process, converts the intensity of the interference light IL1 measured by the interference intensity measurement unit 51 (Vp−p) into an electric field amplitude value E based on the relationship (fitting function R shown in FIG. 3A) between the electric field amplitude value E of the light incident on the photomultiplier tube 30 and the electrical signal value (voltage signal V) output from the photomultiplier tube 30, thereby calculating the electric field amplitude value E of the interference light IL1 for each value of the time difference Δt corresponding to the optical path length difference Δd. Note that there is a relationship "Δt=Δd/c" between the optical path length difference Δd and the time difference Δt, where c is the speed of light in a vacuum.

Figure 5A:
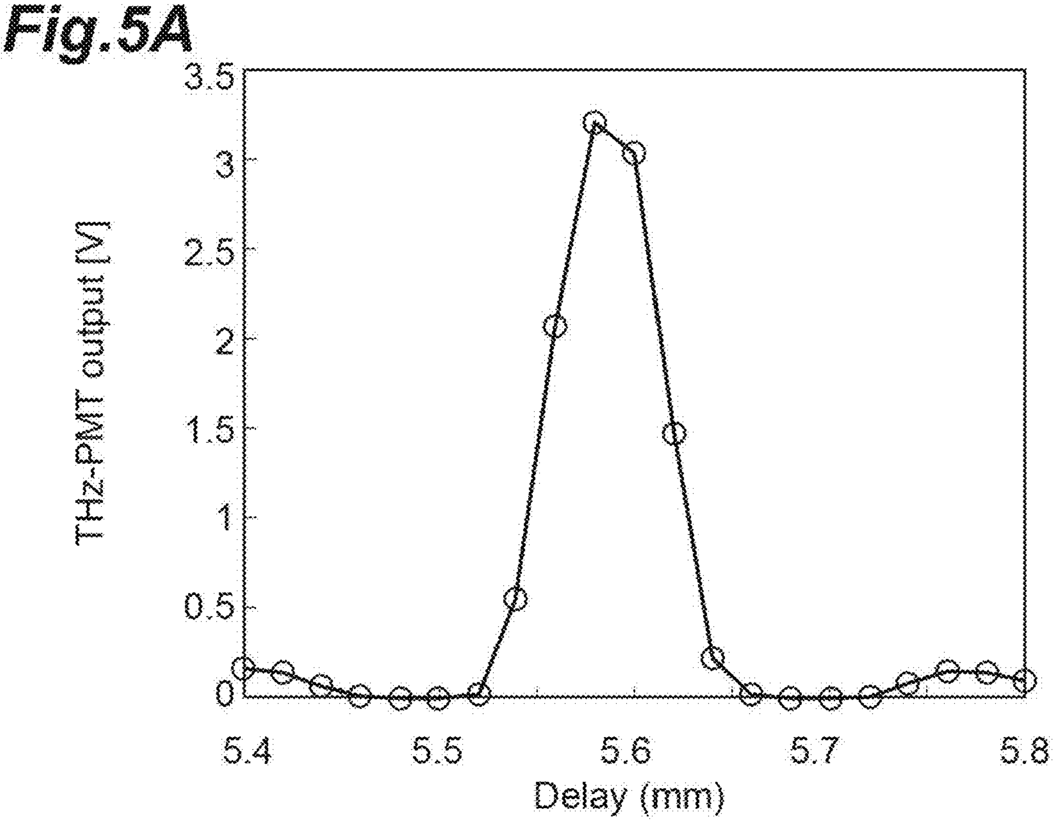
FIG. 5A is a graph showing the optical path length difference Δd dependence of Vp−p.

For example, the analysis unit 52 can estimate the optical path length difference Δd at each measurement point based on the detection result of the interference light IL2 by the detector 40 (i.e., the signal value corresponding to the intensity of the interference light IL2). This allows the analysis unit 52 to associate the Vp−p measured by the interference intensity measurement unit 51 at each measurement point with the corresponding optical path length difference Δd, thereby obtaining Vp−p corresponding to each value of the optical path length difference Δd. As a result, a graph showing the dependence of Vp−p on the optical path length difference Δd as shown in FIG. 5A can be obtained.

The process for obtaining Vp−p corresponding to each value of the optical path length difference Δd using the detection result of the interference light IL2 is not limited to the above process. As another example, the analysis unit 52 may be configured to perform a correction process using the detection result of the interference light IL2 by the detector 40. For example, the analysis unit 52 may obtain the first information (Vp−p corresponding to each value of the optical path length difference Δd) without using the detection result of the interference light IL2 by the detector 40, and then correct the first information based on the detection result of the interference light IL2 by the detector 40. For example, when the rotating mirror 24 is continuously driven at a constant frequency, the angle of the rotating mirror 24 at each measurement point (i.e., the optical path length difference Δd corresponding to the angle) can be estimated with a certain degree of accuracy based on the elapsed time from the start of the driving of the rotating mirror 24. By associating the Vp−p measured at each measurement point with the estimated optical path length difference Δd at each measurement point, the first information can be obtained. The analysis unit 52 may compare the optical path length difference Δd estimated based on the elapsed time with the optical path length difference Δd accurately estimated based on the detection result of the interference light IL2 by the detector 40, and correct the waveform of the first information based on the comparison result, thereby obtaining the final information (Vp−p corresponding to each value of the optical path length difference Δd).

Figure 5B:
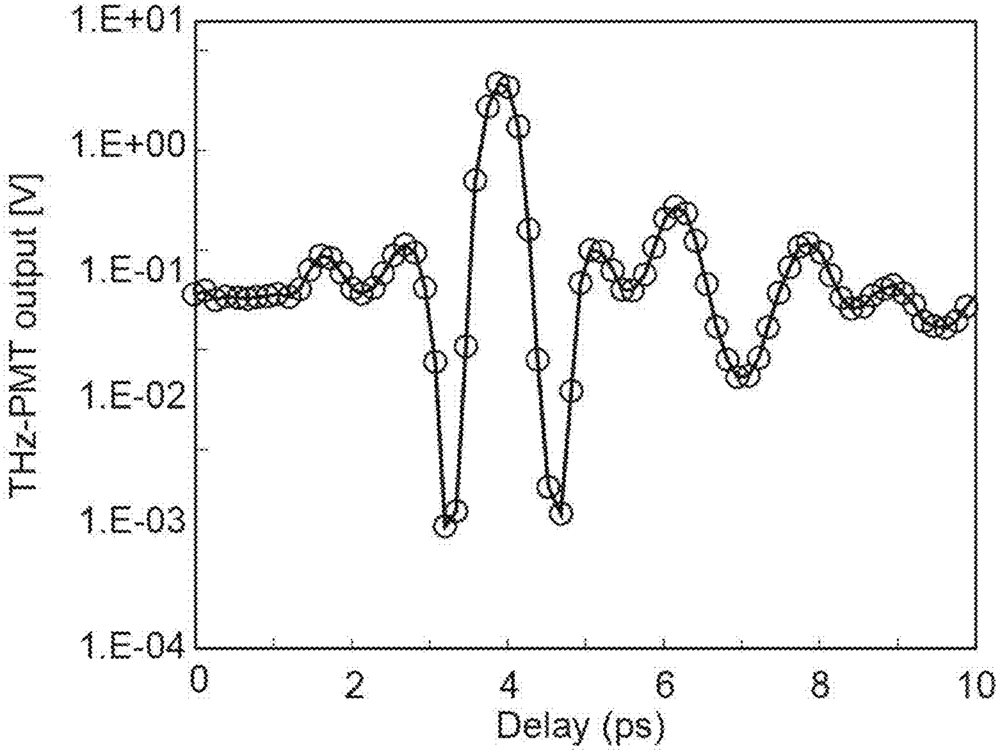
FIG. 5B is a graph showing the time difference Δt dependence of Vp−p.

Subsequently, the analysis unit 52 can obtain Vp−p corresponding to each value of the time difference Δt by converting the optical path length difference Δd into the time difference Δt using the relationship "At =Δd/c" between the optical path length difference Δd and the time difference Δt. As a result, a graph showing the dependence of Vp−p on the time difference Δt as shown in FIG. 5B can be obtained.

Figure 6A:
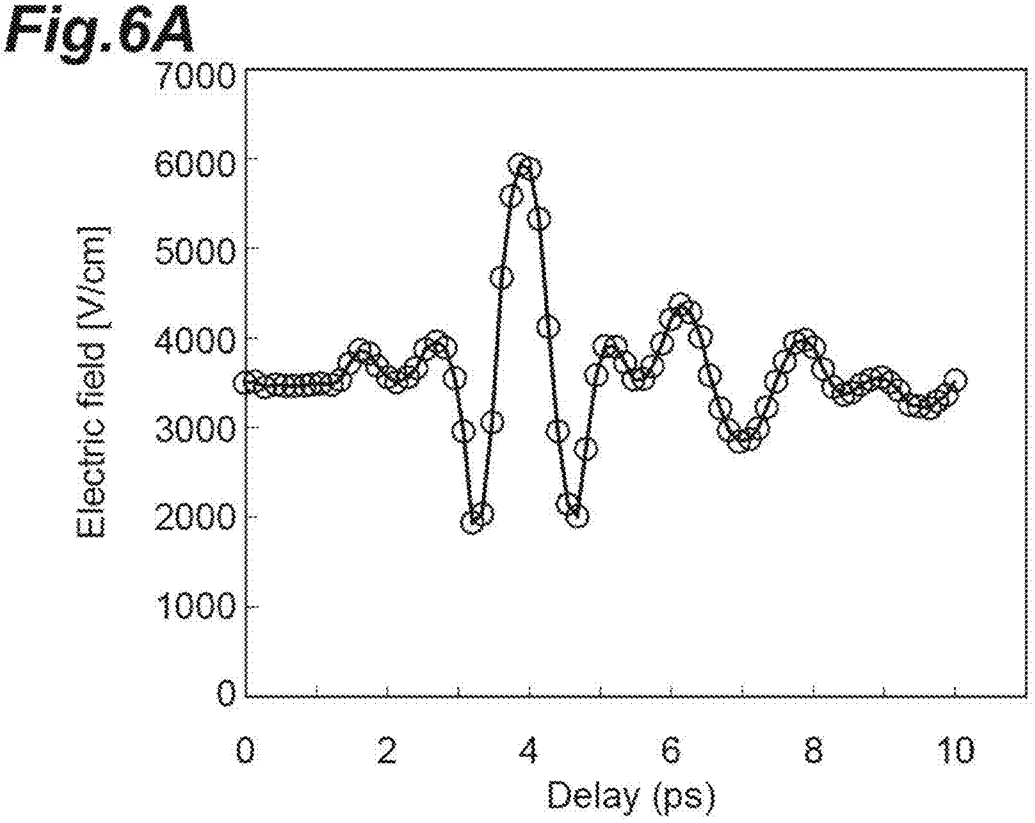
FIG. 6A is a graph showing the time difference Δt dependence of the electric field amplitude value E of the interference light.

Subsequently, the analysis unit 52 converts the intensity of the interference light IL1 (Vp−p) into the electric field amplitude value E based on the fitting function R representing the input-output characteristics of the photomultiplier tube 30 (see FIG. 3A). As a result, a graph showing the dependence of the electric field amplitude value E of the interference light IL1 on the time difference Δt as shown in FIG. 6A can be obtained.

(Second Process)

Figure 6B:
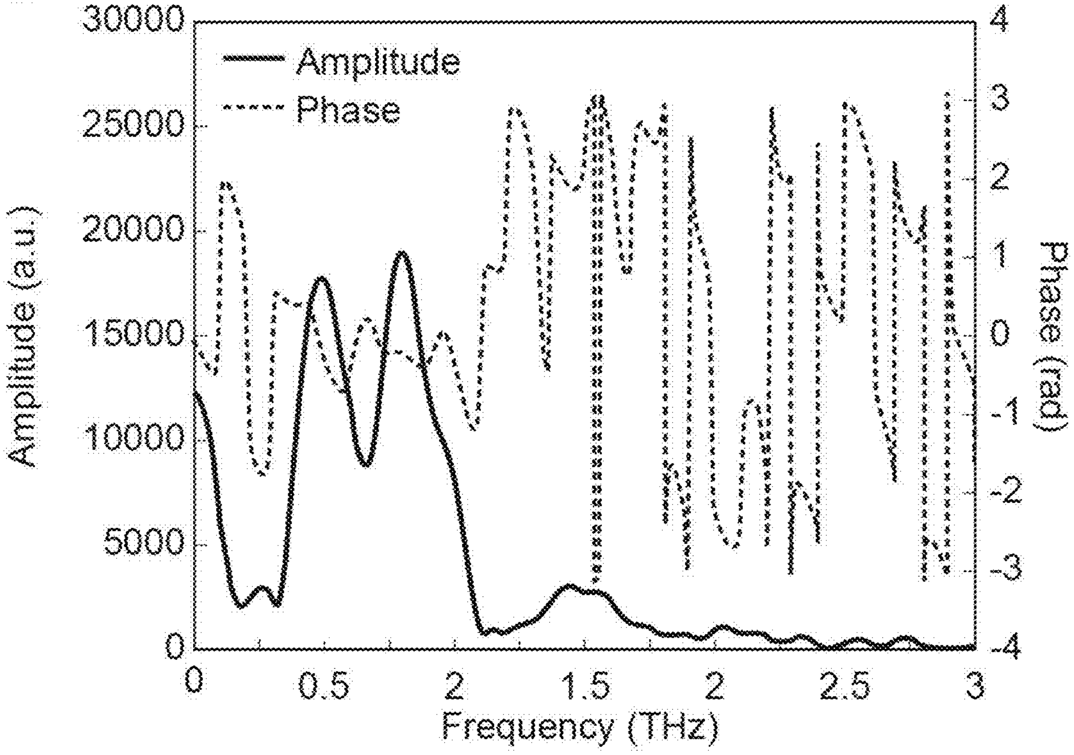
FIG. 6B is a diagram showing the amplitude spectrum and phase spectrum of the electric field amplitude value E of the interference light.

The analysis unit 52 performs Fourier transform based on the dependence of the electric field amplitude value E of the interference light IL1 on the value of the time difference Δt calculated in the first process, thereby analyzing the analyze-target object S. The Fourier transform described above provides a graph showing the amplitude spectrum (solid line) and phase spectrum (dashed line) of the electric field amplitude value E of the interference light IL1 as shown in FIG. 6B. Hereinafter, an example of the analysis (identification) of the analyze-target object S by the analysis unit 52 will be described.

In the interferometric measurement apparatus 1A, which includes an interferometric optical system 20 having a Michelson interferometer configuration, the terahertz wave L1 passes through the analyze-target object S twice. Let the phase refractive index of the analyze-target object S be n(ω), the extinction coefficient be k(ω), and the complex refractive index be n'(ω)=n(ω)+ik(ω), where ω is the angular frequency of the terahertz wave. If the frequency of the terahertz wave L1 is f, then ω=2πf, where π is the circular constant and i is the imaginary unit.

Let $E_{sample}(\omega)$ be the electric field amplitude value of the interference light IL1 obtained with the analyze-target object S disposed, and $E_{ref}(\omega)$ be the electric field amplitude value of the interference light IL1 obtained without the analyze-target object S. The ratio T(ω) of these values is expressed by the following equation (1). The interface amplitude transmittance from air to the analyze-target object S is $t_{as}$, which is expressed by the following equation (2). The interface amplitude transmittance from the analyze-target object S to air is $t_{sa}$, which is expressed by the following equation (3). The thickness of the analyze-target object S is d, and c is the speed of light in a vacuum.

$$T(\omega) = \frac{E_{sample}(\omega)}{E_{ref}(\omega)} = (t_{as}t_{sa})^2\exp\left[2i\frac{\{n'(\omega)-1\}\omega d}{c}\right] = (t_{as}t_{sa})^2\exp\left[-\frac{2k\omega d}{c}\right]\exp\left[2i\frac{\{n(\omega)-1\}\omega d}{c}\right] \quad (1)$$

$$t_{as} = \frac{2}{n(\omega)+1} \quad (2)$$

$$t_{sa} = \frac{2n(\omega)}{n(\omega)+1} \quad (3)$$

By decomposing the above equation (1) into real and imaginary parts, the following equations (4) to (6) are obtained. φ(ω) is the phase spectrum, and α(ω) is the absorption coefficient. In the interferometric measurement apparatus 1A, the analysis unit 52 can analyze the analyze-target object S based on these equations.

$$n(\omega) = 1 + \frac{c}{2\omega d}\phi(\omega) \quad (4)$$

$$k(\omega) = \frac{c}{2\omega d}\left[\ln\left\{\frac{4n(\omega)}{n(\omega)+1}\right\}^2 - \ln\{T(\omega)\}\right] \quad (5)$$

$$\alpha(\omega) = \frac{2\omega k(\omega)}{c} \quad (6)$$

Figure 7A:
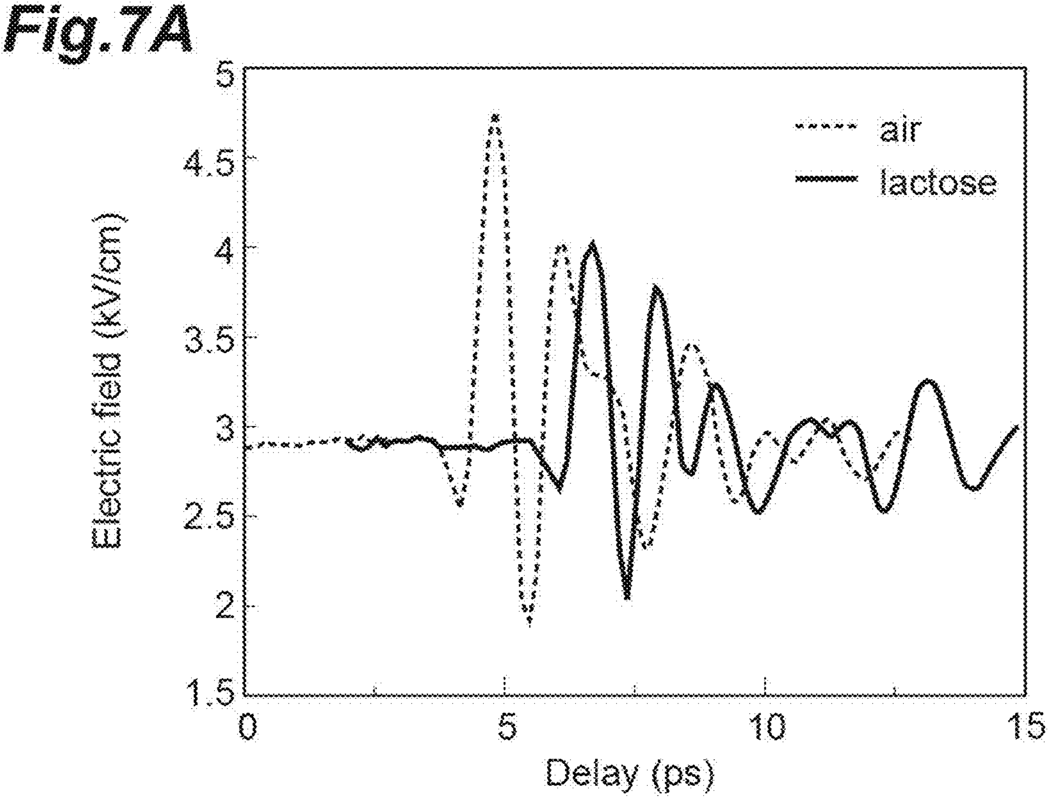
FIG. 7A is a graph showing the time difference Δt dependence of the electric field amplitude value E of the interference light.

FIGS. 7A, 7B, 8A, 8B, and 8C are graphs showing examples of the measurement and analysis results by the interferometric measurement apparatus 1A. The graph in FIG. 7A is obtained by the first process of the analysis unit 52 (corresponding to the graph in FIG. 6A). The graphs in FIGS. 7B, 8A, 8B, and 8C are obtained by the second process of the analysis unit 52 (corresponding to the graph in FIG. 6B and the graphs derived from it).

Figure 7B:
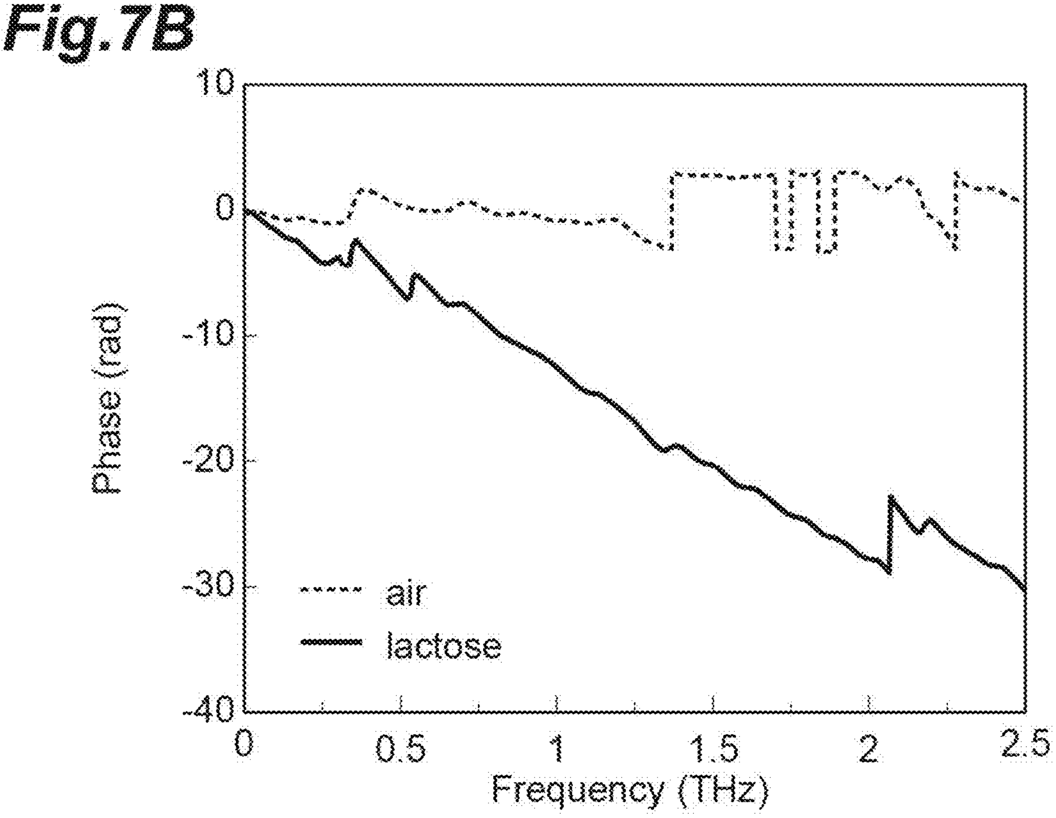
FIG. 7B is a graph showing the phase spectrum of the electric field amplitude value E of the interference light.
Figure 8A:
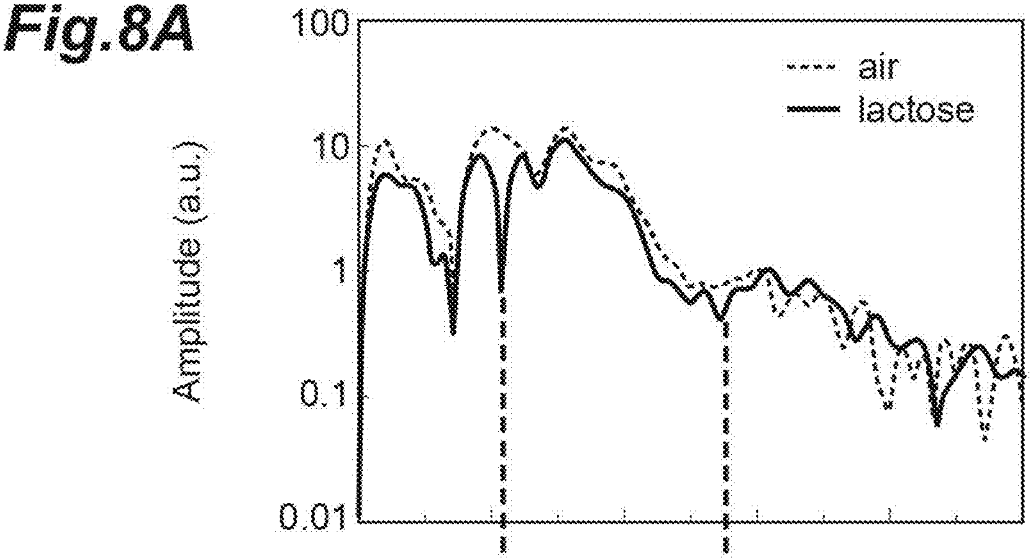
FIG. 8A is a graph showing the amplitude spectrum of the electric field amplitude value E of the interference light.

FIG. 7A is a graph showing the dependence of the electric field amplitude value E of the interference light IL1 on the time difference Δt. FIG. 7B is a graph showing the phase spectrum of the electric field amplitude value E of the interference light IL1. FIG. 8A is a graph showing the amplitude spectrum of the electric field amplitude value E of the interference light IL1. These figures show the cases where the analyze-target object S is disposed and not disposed. In this example, lactose is used as the analyze-target object S.

Figure 8B:
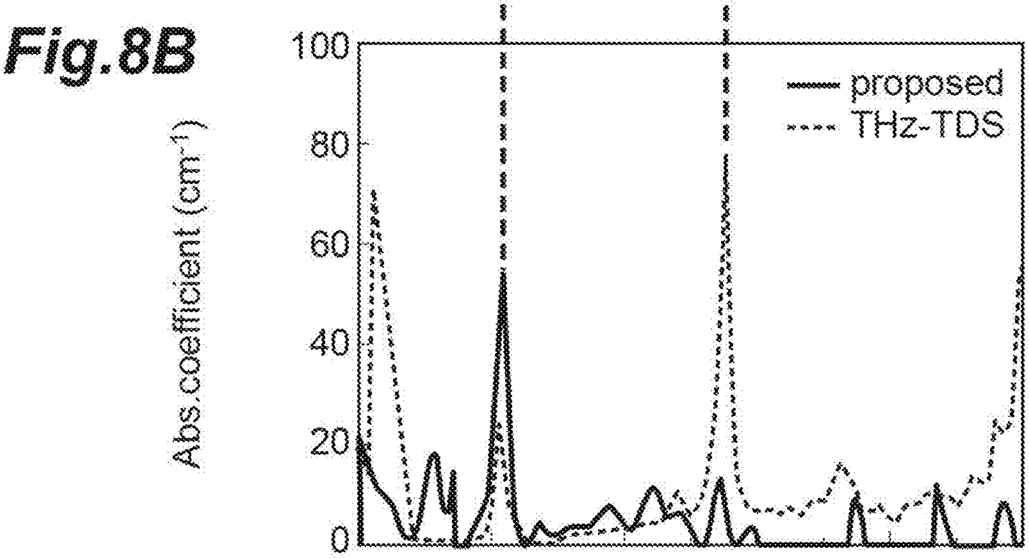
FIG. 8B is a graph showing the spectrum of the absorption coefficient α(ω).
Figure 8C:
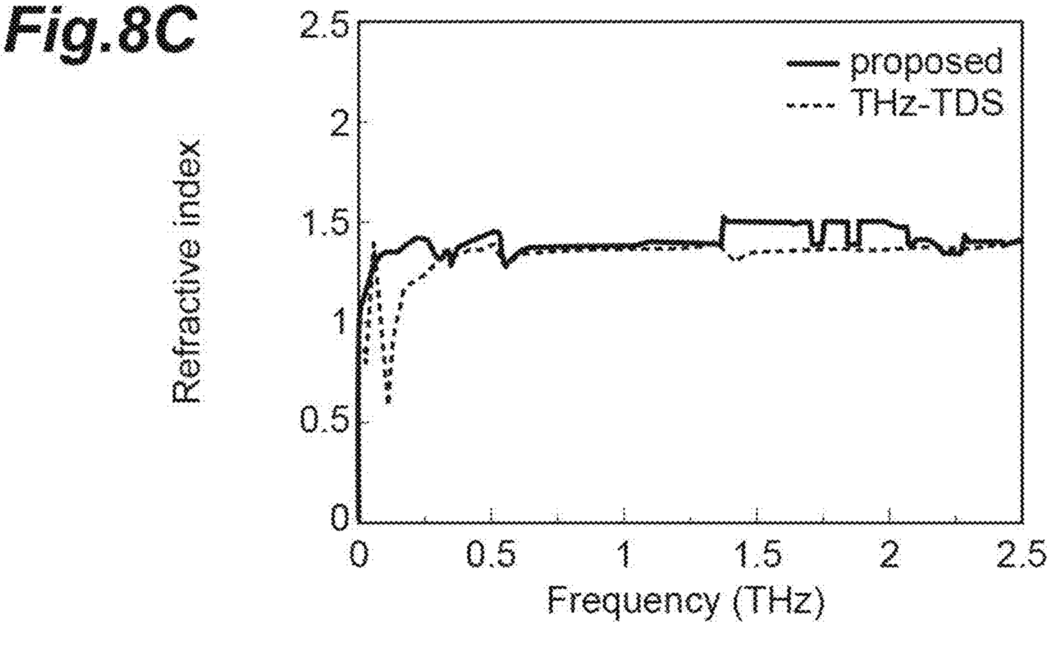
FIG. 8C is a graph showing the spectrum of the refractive index n(ω).

FIG. 8B is a graph showing the spectrum of the absorption coefficient α(ω). FIG. 8C is a graph showing the spectrum of the refractive index n(ω). These figures show the analysis results according to this embodiment and the analysis results by the THz-TDS of Related Art 1.

As can be seen by comparing the analysis results according to this embodiment with the analysis results by the THz-TDS of Related Art 1, the positions of the absorption peaks appearing in the spectrum of the absorption coefficient α(ω) are consistent between the two. This indicates that the analyze-target object S can be analyzed according to this embodiment.

Effects of the First Embodiment

Conventionally, when incorporating a mechanism using reference light for measuring optical path length difference into an interferometric measurement apparatus, it is common to use light with a relatively short wavelength (e.g., 0.63 μm wavelength as shown in the upper part of FIG. 4) as the reference light to measure the optical path length difference as finely as possible. In contrast, in the interferometric measurement apparatus 1A, light with a relatively long wavelength (3 μm or more) is purposely used as the reference light L2. This allows for suitable resolution and dynamic range in measuring the optical path length difference in Fourier spectroscopy analysis using terahertz waves L1.

More specifically, in this embodiment, by making the sweep width of the optical path length difference Δd relatively long (10 mm width) and rotating the rotating mirror 24 within an appropriate angle range (e.g., 25° rotation width), the optical path length difference Δd changes by about 1 μm with a slight rotation of the rotating mirror 24 by 0.0025°. Therefore, when using light with a wavelength of 0.63 μm as the reference light L2 as shown in the upper part of FIG. 4, the resolution is too fine (i.e., the wavelength is shorter than the change width of the optical path length difference Δd (1 μm)), making it difficult to measure the change amount of the optical path length difference Δd appropriately. In contrast, in this embodiment, by using light with a relatively long wavelength (e.g., 10 μm) as the reference light L2 as shown in the lower part of FIG. 4, the change in the optical path length difference Δd of about 1 μm can be measured appropriately.

Furthermore, a beam splitter for transmitting terahertz waves generally does not transmit visible to near-infrared light, but by using reference light with a wavelength of 3 μm or more (i.e., mid-infrared to far-infrared light), a common beam splitter 22 can be used for both the terahertz wave L1 and the reference light L2. This allows the optical path for the terahertz wave L1 to generate the first interference light IL1 and the optical path for the reference light L2 to generate the second interference light IL2 to be set on the same optical path (i.e., optical paths Pa and Pb). As a result, the optical path length difference Δd in the first interference light IL1 can be accurately measured based on the second interference light IL2 of the reference light L2 generated on the same optical path as the terahertz wave L1. According to the above configuration, while continuously changing the optical path length difference Δd between the split light La and the split light Lb, measurement can be performed while appropriately monitoring the change in the optical path length difference Δd in real-time based on the second interference light IL2, enabling fast and suitable interferometric measurement using terahertz waves L1.

Furthermore, the analysis unit 52 is configured to analyze the analyze-target object S by executing the first process and the second process described above. According to the above configuration, by obtaining the electric field amplitude value E of the interference light IL1 corresponding to each value of the time difference Δt based on the conversion relationship (e.g., the fitting function R shown in FIG. 3A) between the electric field amplitude value E and the electrical signal value (Vp−p), Fourier spectroscopy using interferometric measurement with terahertz waves L1 can be performed quickly and accurately.

Furthermore, the interferometric optical system 20 is configured to be capable of changing the optical path length of the optical path Pa by driving the mirror 23 and capable of changing the optical path length of the optical path Pb by driving the rotating mirror 24. According to the above configuration, one mirror (e.g., the mirror 23) can be used as an initial setting mirror for adjusting the optical path length difference Δd to be near zero in the initial state, and the other mirror (e.g., the rotating mirror 24) can be used as a movable mirror for changing the optical path length difference Δd during interferometric measurement, enabling a suitable configuration for interferometric measurement.

Furthermore, the rotating mirror 24 is configured to be rotationally driven so that the optical path length of the optical path Pb changes, and the optical path Pb is constituted by the optical path from the beam splitter 22 to the mirror 25 via the rotating mirror 24 and the optical path returning to the beam splitter 22 via the rotating mirror 24 after being reflected by the mirror 25. According to the above configuration, by rotationally driving the rotating mirror 24, measurement can be performed while changing the optical path length difference Δd quickly compared to using a mirror that can be moved parallel to the direction perpendicular to the reflecting surface like the mirror 23. As a result, the analysis by the interferometric measurement apparatus 1A can be sped up.

Furthermore, the light source 12 that outputs the reference light L2 is constituted by a quantum cascade laser element. To detect the second interference light IL2 with high precision in the detector 40, it is preferable to use light with as narrow a spectral linewidth (wavelength linewidth) as possible as the reference light L2. By using a quantum cascade laser element with the property of outputting light with a relatively narrow spectral linewidth compared to lamp light source and so on as the light source 12, the detection precision of the second interference light IL2 in the detector 40 can be enhanced. From the above perspective, it is more preferable that the light source 12 is a distributed feedback (DFB) quantum cascade laser element.

Furthermore, the width of the periodic change in the optical path length difference Δd due to the rotational driving of the rotating mirror 24 is 3 mm or more (10 mm in this embodiment). According to the above configuration, appropriate resolution and measurement dynamic range can be obtained for the optical path change of the terahertz wave L1.

Second Embodiment

Figure 9:
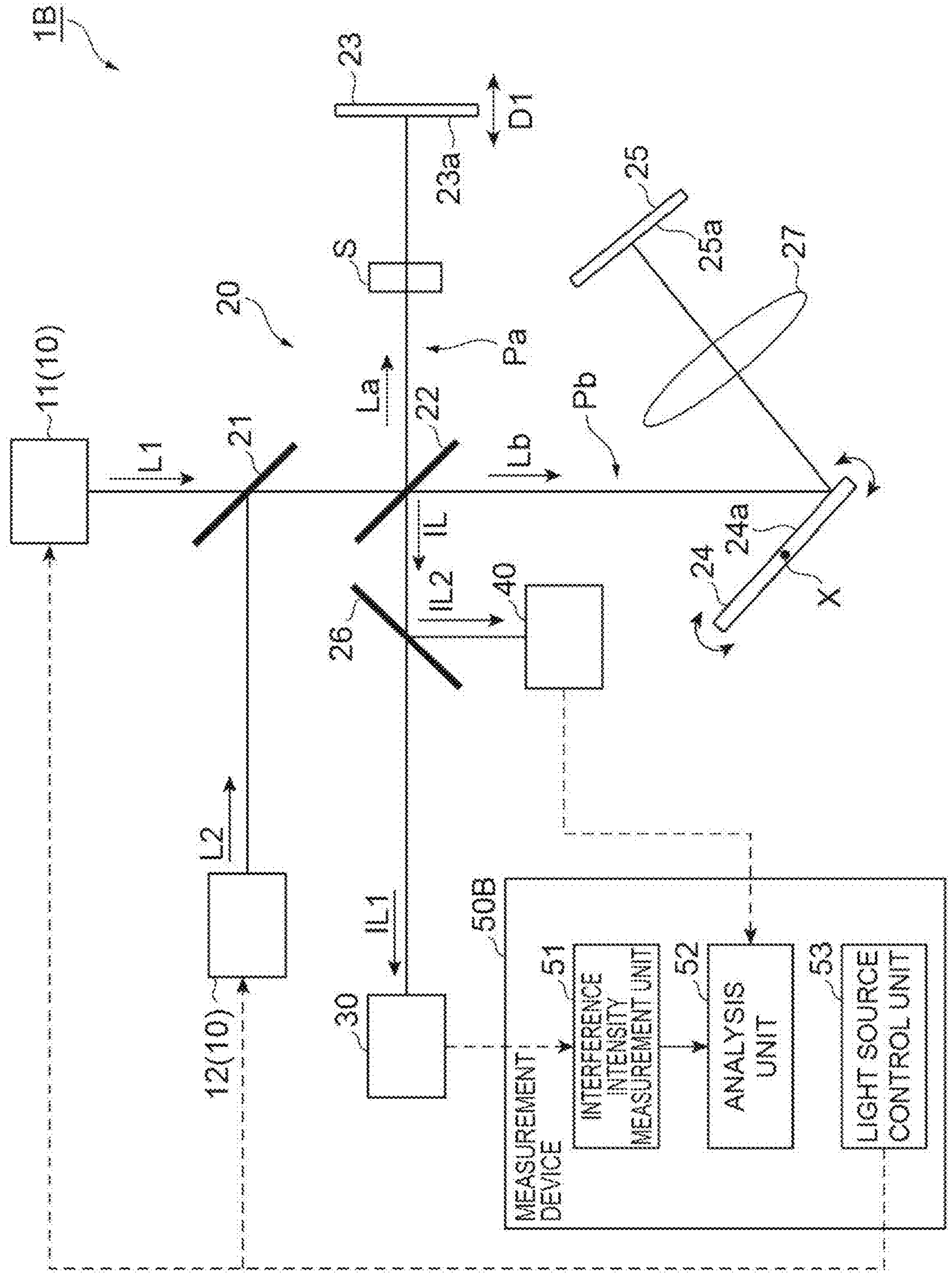
FIG. 9 is a diagram showing a configuration example of an interferometric measurement apparatus according to the second embodiment.
Figure 10:
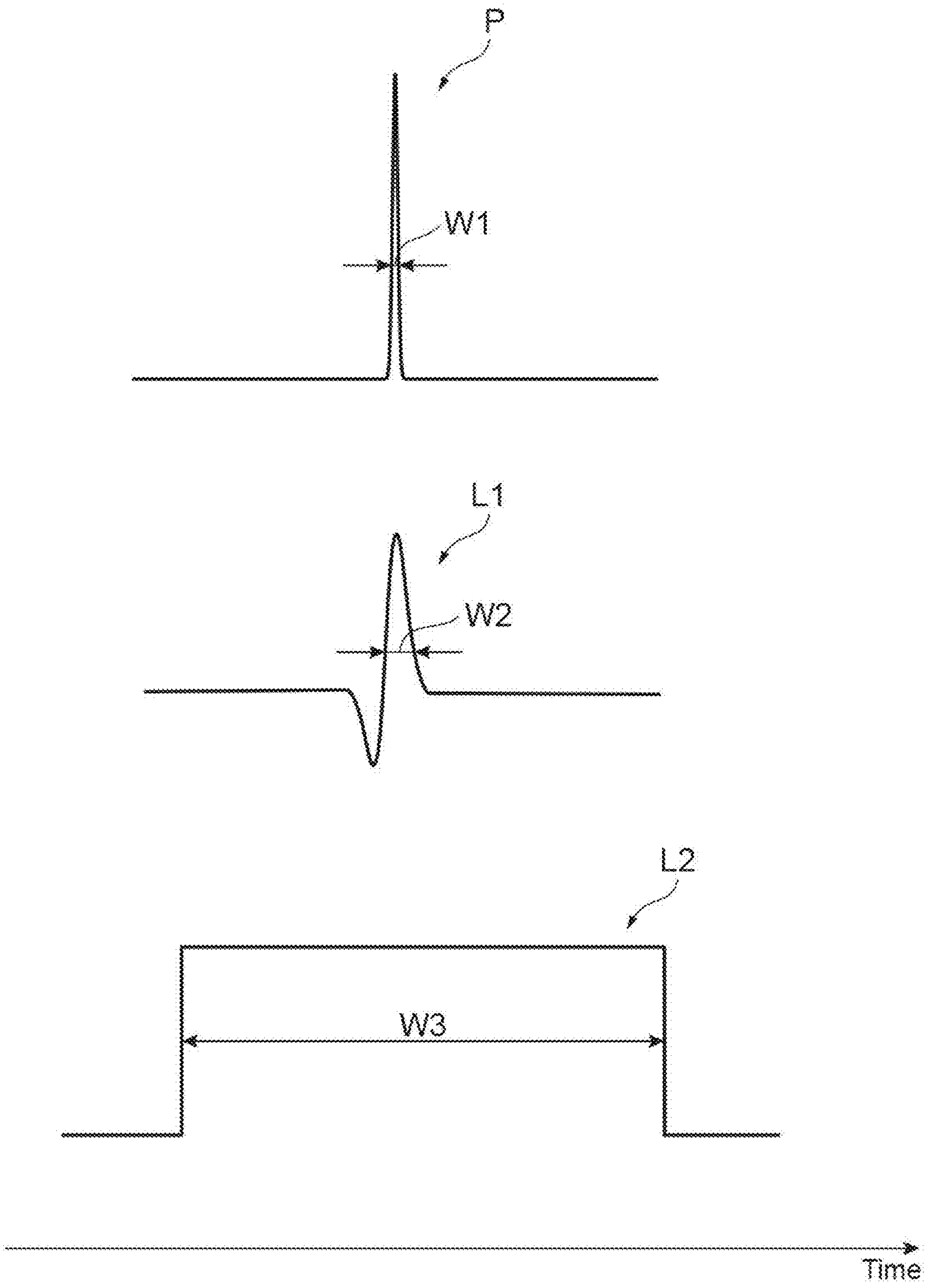
FIG. 10 is a diagram showing an example of pulse synchronization control in the interferometric measurement apparatus of the second embodiment.

The interferometric measurement apparatus 1B of the second embodiment will be described with reference to FIGS. 9 and 10. The interferometric measurement apparatus 1B differs from the interferometric measurement apparatus 1A in that it includes a measurement device 50B instead of the measurement device 50. The measurement device 50B differs from the measurement device 50 in that it further includes a light source control unit 53. The interferometric measurement apparatus 1B also differs from the interferometric measurement apparatus 1A in that both the light source 11 and the light source 12 are pulse-driven (i.e., both the terahertz wave L1 and the reference light L2 are pulsed light). Hereinafter, the differences between the interferometric measurement apparatus 1B and the interferometric measurement apparatus 1A will be described, and redundant descriptions of the same configurations as those of the interferometric measurement apparatus 1A will be omitted.

The light source control unit 53 controls the driving of the light source 11 and the light source 12. Specifically, the light source control unit 53 synchronizes the light source 11 and the light source 12 in pulse mode. For example, as shown in FIG. 10, the light source control unit 53 generates a pulse P with a pulse width W1 at a constant period (longer than the pulse width W3 of the reference light L2 described later) and outputs the pulse P as a trigger signal to the light source 11 and the light source 12. This allows the light source 11 and the light source 12 to output the terahertz wave L1 as pulsed light with a pulse width W2 and the reference light L2 as pulsed light with a pulse width W3 at the same timing (the generation timing of the pulse P). For example, the pulse width W1 of the pulse P is set to about 50 fs, the pulse width W2 of the terahertz wave L1 is set to about 1 ps, and the pulse width W3 of the reference light L2 is set to a sufficiently larger value (e.g., about 100 ns) than the pulse width W2 of the terahertz wave L1.

According to the interferometric measurement apparatus 1B, the same measurement as that of the interferometric measurement apparatus 1A can be performed, and by synchronizing and pulse-driving the light source 11 and the light source 12, cooling of the light source 11 and the light source 12 can be made unnecessary. Furthermore, compared to the case where the light source 11 and the light source 12 are continuously driven, the device life of the light source 11 and the light source 12 can be extended.

Third Embodiment

Figure 11:
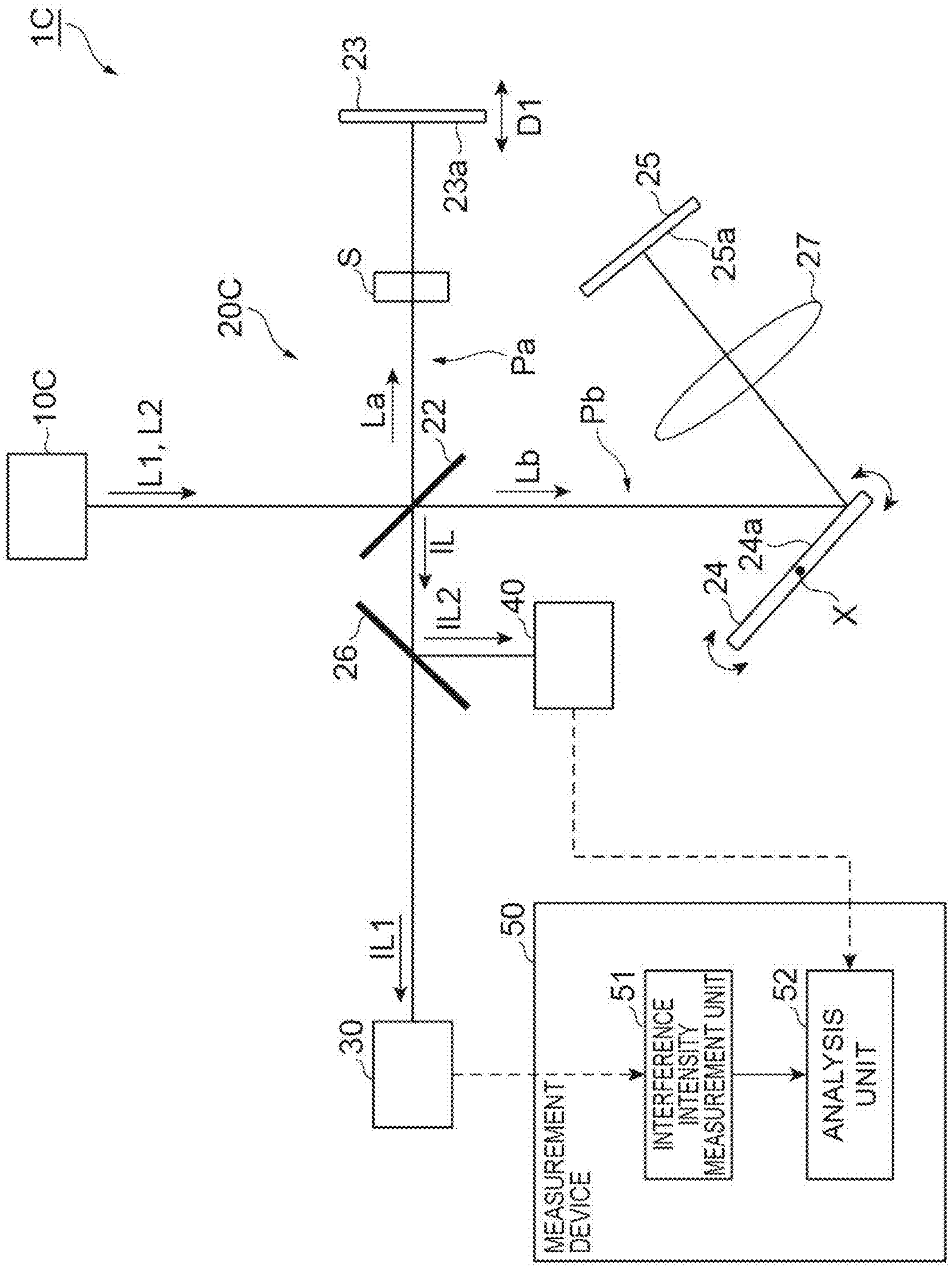
FIG. 11 is a diagram showing a configuration example of an interferometric measurement apparatus according to the third embodiment.

The interferometric measurement apparatus 1C of the third embodiment will be described with reference to FIG. 11. The interferometric measurement apparatus 1C differs from the interferometric measurement apparatus 1A in that it includes a single light source 10C instead of the light source 10 constituted by the light sources 11 and 12. The interferometric measurement apparatus 1C also differs from the interferometric measurement apparatus 1A in that it includes an interferometric optical system 20C instead of the interferometric optical system 20. The interferometric optical system 20C differs from the interferometric optical system 20 in that the beam splitter 21 is omitted. Hereinafter, the differences between the interferometric measurement apparatus 1C and the interferometric measurement apparatus 1A will be described, and redundant descriptions of the same configurations as those of the interferometric measurement apparatus 1A will be omitted.

The light source 10C is constituted by a single quantum cascade laser element having a dual upper subband level structure and capable of generating both the terahertz wave L1 and the reference light L2 by multiple intersubband transitions. The light source 10C may be constituted by a quantum cascade laser element having a configuration similar to that disclosed in Patent Document 1 (Japanese Patent No. 6276758).

For example, the light source 10C is configured to generate the first light with a first frequency $\omega_1$ and the second light with a second frequency $\omega_2$ by multiple intersubband transitions, and to generate the terahertz wave L1 with a difference frequency $\omega_{THz}$ ($\omega_{THZ}=|\omega_1-\omega_2|$) of the first frequency $\omega_1$ and the second frequency $\omega_2$ by difference frequency generation. For example, the first light and the second light are mid-infrared light. Furthermore, one of the first light and the second light (e.g., the first light) may be light with a fixed wavelength, and the other (e.g., the second light) may be light with a variable wavelength (or broadband light). In this case, the first light with a fixed wavelength can be suitably used as the reference light L2. Additionally, by making the second light variable in wavelength (or broadband), the wavelength sweep width of the terahertz wave L1 can be increased.

According to the interferometric measurement apparatus 1C, it is possible to output both the terahertz wave L1 for interferometric measurement and the reference light L2 for measuring optical path length difference with a single light source (quantum cascade laser element). As a result, compared to the case where the light source is constituted by two light sources (i.e., a first light source that outputs the terahertz wave L1 and a second light source that outputs the reference light L2), the number of light sources can be reduced. Furthermore, it is unnecessary to use a member for adjusting the terahertz wave L1 output from the first light source and the reference light L2 output from the second light source to be incident coaxially on the beam splitter 22 (e.g., the beam splitter 21 provided in front of the beam splitter 22 in the first embodiment). Therefore, according to the interferometric measurement apparatus 1C, the configuration of the light source and the interferometric optical system can be simplified.

[Modifications]

The present disclosure has been described with reference to several embodiments, but the present disclosure is not limited to the configurations shown in the above embodiments. The materials and shapes of the respective components are not limited to the specific materials and shapes described above, and various other materials and shapes can be adopted. Furthermore, some of the configurations included in the above embodiments may be omitted or changed as appropriate, and may be combined arbitrarily.

For example, the photomultiplier tube 30 may be capable of imaging the intensity distribution of the incident light. When the electron multiplication part 32 includes a microchannel plate (e.g., image intensifier), the intensity distribution of the incident light can be imaged. By using such a photomultiplier tube 30, it is possible to perform imaging analysis of the analyze-target object S.

The analysis unit 52 performs the analysis (identification) of the analyze-target object S by converting the intensity (Vp−p) of the interference light IL1 measured by the interference intensity measurement unit 51 into the electric field amplitude value and performing Fourier transform based on the dependence of the electric field amplitude value on the time difference Δt. However, the analysis unit 52 may perform the analysis of the analyze-target object S by other methods. For example, the analysis unit 52 may perform the analysis of the analyze-target object S by other methods without converting the intensity (Vp−p) of the interference light IL1 corresponding to each value of the time difference Δt into the electric field amplitude value. Even in such cases, the same effects as those of the interferometric measurement apparatus 1A described above can be achieved. In other words, based on the second interference light IL2 of the reference light L2 generated on the same optical path as the terahertz wave L1, the optical path length difference Δd in the first interference light IL1 can be accurately measured, and measurement can be performed while appropriately monitoring the change in the optical path length difference Δd in real-time based on the second interference light IL2, enabling fast and suitable interferometric measurement using terahertz waves L1.

The components constituting the interferometric optical systems 20 and 20C may be changed or omitted as appropriate within the range that allows the measurement by the interferometric measurement apparatuses 1A to 1C described above. Similarly, the arrangement of the components constituting the interferometric optical systems 20 and 20C may be changed as appropriate. Furthermore, other optical components not described in the above embodiments may be added to the interferometric optical systems 20 and 20C as appropriate. For example, a lens may be disposed between the beam splitter 26 and the photomultiplier tube 30 to enhance the efficiency of the interference light IL1 incident on the photomultiplier tube 30. Similarly, a lens may be disposed between the beam splitter 26 and the detector 40 to enhance the efficiency of the interference light IL2 incident on the detector 40.

What is claimed is:

1. An interferometric measurement apparatus comprising:

a light source that outputs a terahertz wave for interferometric measurement and a reference light with a wavelength of 3 μm or more for measuring optical path length difference;

an interferometric optical system that includes: a beam splitter that splits the terahertz wave and the reference light output from the light source and incident coaxially into a first split light and a second split light; a first optical path on which the first split light from the beam splitter is reflected by a first mirror and re-enters the beam splitter; and a second optical path on which the second split light from the beam splitter is reflected by a second mirror and re-enters the beam splitter, and wherein the interferometric optical system is configured to combine the first split light and the second split light re-entered into the beam splitter, wherein the optical path length difference between the first split light and the second split light is variable;

a photomultiplier tube sensitive to the terahertz wave, and configured to output an electrical signal value in accordance with an incident light intensity of a first interference light that is an interference light of the terahertz wave generated by the combination of the first split light and the second split light at the beam splitter;

a detector configured to detect a second interference light that is an interference light of the reference light generated by the combination of the first split light and the second split light at the beam splitter;

an interference intensity measurement unit configured to measure an intensity of the first interference light based on the electrical signal output from the photomultiplier tube; and an analysis unit configured to perform Fourier transform based on the intensity of the first interference light measured by the interference intensity measurement unit and a detection result of the second interference light by the detector, thereby analyzing an analyze-target object disposed on the optical path through which the terahertz wave passes.

2. The interferometric measurement apparatus according to claim 1, wherein the analysis unit is configured to:

convert the intensity of the first interference light measured by the interference intensity measurement unit into an electric field amplitude value based on a relationship between the electric field amplitude value of the light incident on the photomultiplier tube and the electrical signal value output from the photomultiplier tube, thereby calculating the electric field amplitude value of the first interference light for each value of time difference corresponding to the optical path length difference; and perform Fourier transform based on dependency of the calculated electric field amplitude value of the first interference light on the value of the time difference to analyze the analyze-target object.

3. The interferometric measurement apparatus according to claim 1, wherein the interferometric optical system is configured to be capable of changing an optical path length of the first optical path by driving the first mirror and capable of changing an optical path length of the second optical path by driving the second mirror.

4. The interferometric measurement apparatus according to claim 1, wherein the interferometric optical system further includes a third mirror, wherein the second mirror is configured to be rotationally driven so that an optical path length of the second optical path changes, and wherein the second optical path is configured by an optical path from the beam splitter to the third mirror via the second mirror and an optical path returning to the beam splitter via the second mirror after being reflected by the third mirror.

5. The interferometric measurement apparatus according to claim 1, wherein the detector is any one of a quantum cascade detector, an MCT detector, a superlattice infrared detector element, an InSb detector element, an InAs detector element, and an InAsSb detector element.

6. The interferometric measurement apparatus according to claim 1, wherein the light source includes a first light source that outputs the terahertz wave and a second light source that outputs the reference light, and the second light source is constituted by a quantum cascade laser element.

7. The interferometric measurement apparatus according to claim 1, wherein the light source is constituted by a single quantum cascade laser element having a dual upper subband level structure and capable of generating both the terahertz wave and the reference light by multiple intersubband transitions.

8. The interferometric measurement apparatus according to claim 1, further comprising a light source control unit configured to control a driving of the light source, wherein the light source includes a first light source that outputs the terahertz wave and a second light source that outputs the reference light, and the light source control unit synchronizes the first light source and the second light source in pulse mode.

9. The interferometric measurement apparatus according to claim 1, wherein the interferometric optical system is configured to be capable of changing an optical path length of the second optical path by driving the second mirror, and a range of periodic change in the optical path length difference between the first split light and the second split light by the driving of the second mirror is 3 mm or more.

* * * * *